United States Patent
Li et al.

(10) Patent No.: US 11,136,265 B1
(45) Date of Patent: Oct. 5, 2021

(54) ARTIFICIAL SANDSTONE AND/OR CONGLOMERATE CORE BASED ON LITHOLOGY AND PERMEABILITY CONTROL AND PREPARATION METHOD AND APPLICATION THEREOF

(71) Applicant: China University of Petroleum (Beijing), Beijing (CN)

(72) Inventors: Yiqiang Li, Beijing (CN); Wenbin Gao, Beijing (CN); Zheyu Liu, Beijing (CN); Deng Pan, Beijing (CN); Yanjuan Li, Beijing (CN)

(73) Assignee: CHINA UNIVERSITY OF PETROLEUM (BEIJING), Beijing (CN)

( * ) Notice: Subject to any disclaimer, the term of this patent is extended or adjusted under 35 U.S.C. 154(b) by 0 days.

(21) Appl. No.: 17/008,071

(22) Filed: Aug. 31, 2020

(30) Foreign Application Priority Data

Jul. 9, 2020 (CN) .......................... 202010657405.8

(51) Int. Cl.
*C04B 14/06* (2006.01)
*C09K 8/467* (2006.01)
*C04B 28/04* (2006.01)

(52) U.S. Cl.
CPC .............. *C04B 14/06* (2013.01); *C04B 28/04* (2013.01); *C09K 8/467* (2013.01)

(58) Field of Classification Search
CPC .......... C04B 14/08; C04B 28/04; C09K 8/467
See application file for complete search history.

(56) References Cited

FOREIGN PATENT DOCUMENTS

| CN | 103910514 A | | 7/2014 |
|---|---|---|---|
| CN | 104034563 A | | 9/2014 |
| CN | 104692726 A | | 6/2015 |
| CN | 105884255 A | * | 8/2016 |
| CN | 107742031 A | | 2/2018 |
| CN | 108218293 A | | 6/2018 |
| CN | 108414312 A | | 8/2018 |
| CN | 108519259 A | | 9/2018 |
| CN | 108956224 A | | 12/2018 |

* cited by examiner

*Primary Examiner* — Anthony J Green
(74) *Attorney, Agent, or Firm* — Volpe Koenig

(57) ABSTRACT

The present disclosure relates to the technical field of artificial cores, in particular to a preparation method of artificial sandstone and/or conglomerate core based on lithology and permeability control. The method comprises the following steps: mixing and molding sand particles and a cementing agent in sequence, and further adding a curing agent for performing solidification to prepare the artificial sandstone and/or conglomerate core; wherein composition of the sand particles is determined according to properties of the artificial sandstone and/or conglomerate core comprising lithology and permeability. The present disclosure combines the properties of the artificial sandstone and/or conglomerate core with the proportion of the sand particles, particularly regulates and controls the composition of the sand particles according to the lithology and permeability of the artificial sandstone and/or conglomerate core, thereby performing precise control on the artificial sandstone and/or conglomerate core.

11 Claims, 3 Drawing Sheets

ARTIFICIAL SANDSTONE AND/OR CONGLOMERATE CORE BASED ON LITHOLOGY AND PERMEABILITY CONTROL AND PREPARATION METHOD AND APPLICATION THEREOF

CROSS REFERENCE TO RELATED APPLICATIONS

This application claims priority to Chinese Application No. 202010657405.8, filed on 2020 Jul. 9 entitled "an artificial sandstone and/or conglomerate core based on lithology and permeability control and a preparation method and an application thereof", which is specifically and entirely incorporated by reference.

FIELD

The present disclosure relates to the technical field of artificial cores, in particular to an artificial sandstone and/or conglomerate core based on lithology and permeability control and a preparation method and an application thereof.

BACKGROUND

At present, the patents of the clastic rock artificial cores are mainly focused on the artificial sandstone cores and artificial shale cores, and the amount of patents in the field of conglomerate artificial cores is small. In the aspect of permeability control of artificial shale cores, the permeability of shale is generally lower than 1 mD, and the permeability of the artificial shale cores can be ensured to be extremely low only by increasing the used amount of cement in the manufacturing process. Therefore, the problem of permeability control does not require an excessive consideration in the production of artificial shale cores.

In the technical field of artificial sandstone cores, there are many patents for manufacturing artificial cores by using the epoxy resin as a cementing agent, such as CN108956224A, CN108519259A, CN108414312A and CN108218293A.

Compared with the conventional artificial sandstone cores using resin as a cementing agent, the artificial shale cores mostly adopt an inorganic cementation mode, for example, CN104034563A discloses a preparation method of artificial core of jointing shale, and the artificial shale core with certain fracture development and bedding development is prepared by mixing cement, quartz sand, clay, gypsum powder, oatmeal and scraps of paper; CN104692726A discloses a preparation method for a synthetic core of hard brittle hydrated mud shale, the method comprises the steps of preparing set cement with different adding amounts of bentonite and dispersing agent, and preparing the artificial shale cores being capable of accurately simulating the mechanical characteristics of the hard brittle mud shale according to a relational graphs between the compressive strength, the comprehensive index of brittleness as well as the hydration expansibility and the different compositions of the set cement. The permeability of shale is generally lower than 1 mD, and the permeability of the artificial shale core can be ensured to be extremely low only by increasing the used amount of cement in the manufacturing process. Therefore, the problem of permeability control does not require an excessive consideration in the production of artificial shale cores.

CN107742031A discloses that a granularity ratio prediction mathematical model is built based on a statistic analysis result of the gray correlation analysis method and a BP neural network theory, so as to fulfill the purpose of controlling permeability of artificial sandstone core. The method is simple and feasible to operate, but at least hundreds of pieces of artificial core data are needed for training if the accuracy of the model shall be ensured, so that the difficulty of permeability control and the time cost are undoubtedly increased.

CN103910514A discloses a method for preparing an artificial conglomerate core, which proposes a method for preparing an artificial conglomerate core by adding silicate particles into an epoxy resin. Because the granularities in the conglomerate are uneven, large particles are mutually stacked such that the submillimeter-level pores are easily formed, the large pores are easily partially filled by small particles, so that the difference of the internal pores is huge, the special structure of particle multi-stage filling inevitably causes the physical evolution rule of the conglomerate to be different from that of sandstone, and the specific method has not been reported in the physical control of the artificial conglomerate at present.

The artificial conglomerate cores and the artificial sandstone cores are mainly reflected in the granularity of particles, and have differences and connection in the aspect of physical property control. However, the gradient relation between conglomerate and sandstone, namely, the gradient control of lithology, has not been described in a patent at present. The conglomerate oil reservoirs contain conglomerate, and the transitional lithology such as sandstone and sandy conglomerate. Such a different lithology also results in significant differences in seepage rule, such that the lithology problems which are overlooked in sandstone oil reservoirs appear particularly prominent in the conglomerate oil reservoirs.

SUMMARY

The present disclosure aims to solve the problem in the prior art that the permeability and lithology designs of an artificial core are simplified and unified, and provides an artificial sandstone and/or conglomerate core based on lithology and permeability control, and a preparation method and an application thereof. The method combines lithology and permeability, and performs precise control of the artificial sandstone and/or conglomerate core by adjusting the composition of the sand particles.

In order to fulfill the above purpose, a first aspect of the present disclosure provides a method for preparing an artificial sandstone and/or conglomerate core, comprising the following steps: mixing and molding sand particles and a cementing agent in sequence, and further adding a curing agent for performing solidification to prepare the artificial sandstone and/or conglomerate core;

wherein composition of the sand particles is determined according to properties of the artificial sandstone and/or conglomerate core comprising lithology and permeability.

Preferably, the composition of the sand particles is regulated and controlled by Formula (I), $$f(\Phi) = \frac{C}{\sqrt{2\pi}\,\sigma_1} \cdot \exp\left(-\frac{(\Phi-\mu_1)^2}{2\sigma_1^2}\right) + \frac{1-C}{\sqrt{2\pi}\,\sigma_2} \cdot \exp\left(-\frac{(\Phi-\mu_2)^2}{2\sigma_2^2}\right) \quad (I)$$

Wherein $\Phi$ is deposition granularity; C is relative weight, $0 \leq C \leq 1$; $\mu_1$ is a first main peak mean, $\sigma_1$ is a first main peak variance; $\mu_2$ is a second main peak mean, and $\sigma_2$ is a second main peak variance.

A second aspect of the present disclosure provides an artificial sandstone and/or conglomerate core produced with the method provided in the first aspect.

A third aspect of the present disclosure provides an application of the artificial sandstone and/or conglomerate core provided in the second aspect in laboratory experiments of a sandstone and/or conglomerate reservoir formation.

Due to the aforementioned technical solution, the properties of the artificial sandstone and/or conglomerate core are combined with the composition of the sand particles, and the composition of the sand particles is particularly regulated and controlled according to the lithology and permeability of the artificial sandstone and/or conglomerate core, thereby performing precise control on the artificial sandstone and/or conglomerate core.

In addition, the present disclosure provides a cementing agent mainly consisting of Portland cement, wherein the cementing agent is filled in pores and fractures in a small particle mode, so that the pore structure of the artificial sandstone and/or conglomerate core is closer to that of a natural core; the artificial sandstone and/or conglomerate core provided by the present disclosure is used for laboratory experiments of a sandstone and/or conglomerate reservoir formation, so as to ensure the maximum similarity between an indoor displacement experiment and the current situation of oil field development.

BRIEF DESCRIPTION OF THE DRAWINGS

FIG. 1a shows a deposition granularity curve for a natural core, and FIG. 1b shows a deposition granularity curve for an artificial conglomerate-bearing sandstone core;

DETAILED DESCRIPTION

Figure 1:
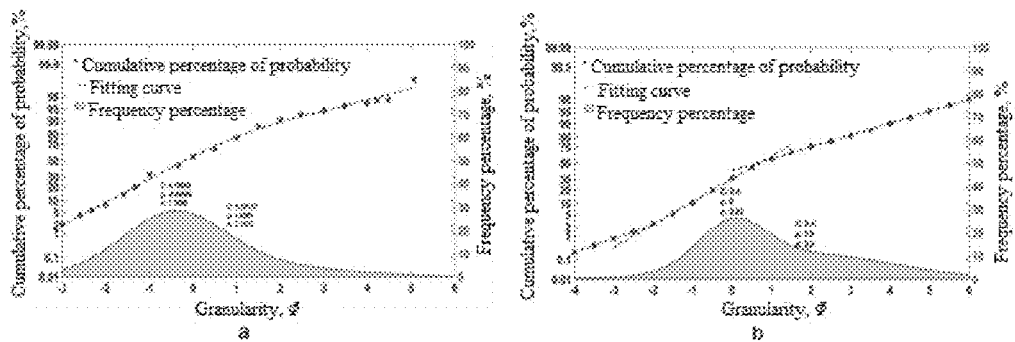
FIG. 1 illustrates a deposition granularity curve of the Example 1.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides a method for preparing an artificial sandstone and/or conglomerate core, comprising the following steps: mixing and molding sand particles and a cementing agent in sequence, and further adding a curing agent for performing solidification to prepare an artificial sandstone and/or conglomerate core;

wherein composition of the sand particles is determined according to properties of the artificial sandstone and/or conglomerate core comprising lithology and permeability.

Unless otherwise and specifically indicated, the lithology and permeability of the artificial sandstone and/or conglomerate core in the present disclosure are determined by the lithology and permeability of the natural core. Therefore, the artificial sandstone and/or conglomerate core with similar lithology and permeability can be manufactured in the present disclosure according to the lithology and the permeability of the natural core, so as to ensure the maximum similarity between an indoor displacement experiment and the current situation of oil field development.

According to the present disclosure, the composition of the sand particles is preferably regulated and controlled by Formula (I), $$f(\Phi) = \frac{C}{\sqrt{2\pi}\,\sigma_1} \cdot \exp\left(-\frac{(\Phi-\mu_1)^2}{2\sigma_1^2}\right) + \frac{1-C}{\sqrt{2\pi}\,\sigma_2} \cdot \exp\left(-\frac{(\Phi-\mu_2)^2}{2\sigma_2^2}\right) \quad (I)$$

Wherein $\Phi$ is deposition granularity; C is relative weight, $0 \le C \le 1$; $\mu_1$ is a first main peak mean, $\sigma_1$ is a first main peak variance; $\mu_2$ is a second main peak mean, and $\sigma_2$ is a second main peak variance. That is, the composition of the sand particles is dependent on the deposition granularity curve of the artificial sandstone and/or conglomerate core.

According to the present disclosure, the deposition granularity value in deposition granularity curve is a result of bimodal granularity superposition, wherein bimodal granularity superposition means that two granularity peaks in normal distribution are mutually superposed, namely design of granularity form diversification of the artificial core is ensured by adjusting the pattern variance of the width, thickness and height of the front and rear granularity peaks; $\mu_1$ is the mean or average of the first granularity peak, i.e., the first major peak mean, typically representing the position of the large particle peak or coarse particle peak; $\sigma_1$ is the variance of the first granularity peak, namely the first main peak variance, the larger is the numerical value, the greater is the peak width; similarly, $\mu_2$ is the mean or average of the second granularity peak, i.e., the second major peak mean, typically representing the position of the small particle peak or fine particle peak; $\sigma_2$ is the variance of the second granularity peak, i.e., the second main peak variance.

Further preferably, the composition of the sand particles is regulated and controlled by the following steps:

1) taking physical property parameters of a natural core as target parameters for regulating and controlling the artificial sandstone and/or conglomerate core, wherein the physical property parameters comprise the relative weight, the first main peak variance and the second main peak variance;

2) obtaining a lithology classification chart based on the relative weight, the first main peak variance and the second main peak variance, and then obtaining the first main peak mean of the artificial sandstone and/or conglomerate core according to the lithology classification chart;

3) obtaining the second main peak mean of the artificial sandstone and/or conglomerate core according to the permeability standard curve of the lithology;

4) obtaining a deposition granularity curve of the artificial sandstone and/or conglomerate core according to the relative weight, the first main peak mean, the first main peak variance, the second main peak mean and the second main peak variance; and 5) determining particle size and weight content of the sand particles according to the deposition granularity curve of the artificial sandstone and/or conglomerate core.

In a preferred embodiment of the present disclosure, the physical property parameters of the natural core in step 1) are obtained by inverse fitting according to the Formula (I). Specifically, the deposition granularity curve of the natural core is tested by adopting the industry standard SY/T5434-2018, and then a parameter range of granularity in the natural core is determined by utilizing the Formula (I), namely the ranges of the relative weight, the first main peak variance and the second main peak variance in the granularity curve of the natural core are counted, and morphological characteristics such as height, width, distance of two normal distribution peaks are respectively identified.

The deposition granularity curve of the natural core in the present disclosure is decomposed into two normal distribution peaks, and the deposition granularity curve of the artificial sandstone and/or conglomerate core with similar lithology and permeability is obtained mainly by adjusting the relative distance of the two normal distribution peaks, namely the first main peak mean $\mu_1$ and the second main peak mean $\mu_2$.

In the present disclosure, the lithology of the artificial sandstone and/or conglomerate core depends on the lithology classification chart, and preferably, the lithology classification chart in the step 2) is obtained by the following steps:

A. Respectively drawing corresponding deposition granularity curves by adjusting relative distance of the first main peak and the second main peak based on the relative weight, the first main peak variance and the second main peak variance in the step 1);

B. Respectively counting weight of particles with different deposition granularities based on the deposition granularity curve, and classifying the lithology of the corresponding core;

C. Drawing the lithology classification charts with different deposition granularities by taking the first main peak mean as an abscissa and the second main peak mean as an ordinate.

Preferably, adjusting the relative distance of the first main peak and the second main peak refers to that the first main peak mean and the second main peak mean are adjusted under the condition that the relative weight, the first main peak variance and the second main peak variance of the artificial sandstone and/or conglomerate core are determined, and corresponding deposition granularity curves are respectively drawn according to the sizes of the first main peak mean and the second main peak mean.

In the present disclosure, the lithology classification purpose of the artificial sandstone and/or conglomerate core is realized by utilizing the deposition granularity curve, the particle weights of 6 grades of medium gravel, fine gravel, coarse sand, medium sand, fine sand and silt sand in the corresponding deposition granularity curve in the step A are respectively counted, the corresponding deposition granularity range is shown in Table 1, and the corresponding deposition granularity curve is classified by referring to the clastic rock naming principle in the industry standard SY/T5434-2018, namely the clastic rock granularity analysis method. The deposition granularity curve is designed by means of a double-peak granularity superposition method, so as to fulfill the purpose of controlling the lithology and permeability of the artificial sandstone and/or conglomerate core.

TABLE 1

| | Gravel | | Sand | | | |
|---|---|---|---|---|---|---|
| Particle grade | Medium gravel | Fine gravel | Coarse sand | Medium sand | Fine sand | Silt sand |
| Particle size, mm | 4-64 | 2-4 | 0.5-2 | 0.25-0.5 | 0.1-0.25 | 0.01-0.1 |
| Particle size, mesh | <5 | 5-9 | 9-32 | 32-62 | 62-150 | 150-1200 |
| Granularity Φ | −6 to −2 | −2 to −1 | −1 to 1 | 1-2 | 2-3.32 | >3.32 |

After determining the weight contents of the sand particles with different grades, classifying the lithology, wherein the lithology is conglomerate when the content of the gravel is more than 50 wt % based on the weight of the sand particles; when the content of the gravel is within a range of 25-50 wt %, the lithology is sandy conglomerate; when the gravel content is within a range of 5-25 wt % and the sand content is more than 75 wt %, the lithology is the conglomerate-bearing sandstone; when the gravel content is less than 5 wt % and the sand content is more than 75 wt %, the lithology is sandstone.

In a preferred embodiment of the present disclosure, the lithology is conglomerate when the gravel content is more than 50 wt %, based on the weight of the sand particles. In particular, when the weight ratio of fine gravel to gravel is greater than 50%, the lithology is fine conglomerate; when the weight ratio of the medium gravel to the gravel is more than 50%, the lithology is medium conglomerate; when the weight ratio of the fine gravel to the medium gravel is 0.4-0.6, the lithology is anisometric conglomerate.

In a preferred embodiment of the present disclosure, the lithology is sandy conglomerate when the gravel content is within a range of 25-50 wt %, based on the weight of the sand particles.

In a preferred embodiment of the present disclosure, the lithology is conglomerate-bearing sandstone when the gravel content is within a range of 5-25 wt % and the sand content is >75 wt %, based on the weight of the sand particles. Specifically, when the weight ratio of coarse sand/medium sand/fine sand to sand content is more than 50%, the lithology is gravel-containing coarse sandstone/gravel-containing medium sandstone/gravel-containing fine sandstone; when the content of coarse sand, medium sand and fine sand/silt sand is respectively and independently more than 20 wt %, and the content of any two of the coarse sand, the medium sand, the fine sand and the silt sand is less than 70 wt % based on the weight of sand content, the lithology is gravel-containing anisometric sandstone.

In a preferred embodiment of the present disclosure, the lithology is sandstone when the gravel content is less than 5 wt % and the sand content is greater than 75 wt %, based on the weight of the sand particles. Specifically, when the weight ratio of coarse sand/medium sand/fine sand to sandstone is more than 50%, the lithology is coarse sandstone/medium sandstone/fine sandstone; when the content of coarse sand, medium sand and fine sand/silt sand is respectively and independently more than 20 wt %, and the content of any two of the coarse sand, the medium sand, the fine sand and the silt sand is less than 70 wt % based on the weight of sand content, the lithology is anisometric sandstone.

In the present disclosure, a preferred embodiment of the lithology classification chart includes: A. under the conditions that the relative weight C=0.4, the first main peak variance $\sigma_1$=0.85 and the second main peak variance $\sigma_2$=2.2, respectively calculating the deposition granularity curves of different values of the first main peak mean and the second main peak mean; B. defining the names of the artificial core under a deposition granularity curve according to the lithology naming rule; C. drawing lithology classification charts of the first main peak mean and the second main peak mean under different deposition granularities, and determining a design parameter range of the target lithology based on the drawn lithology classification charts as shown in FIG. 2.

Figure 2:
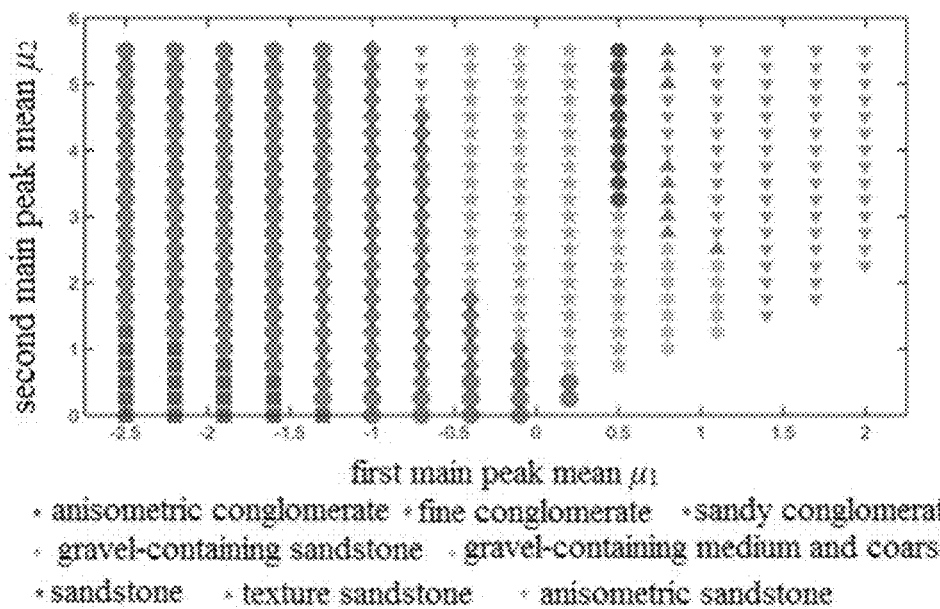
FIG. 2 illustrates a core sorting chart provided by the present disclosure.

As illustrated in FIG. 2, the lithology of the artificial sandstone and/or conglomerate core is determined by the first main peak mean, and the position of the second main peak is adjusted, that is, the second main peak mean changes from small to large, which means that the weight proportion of fine sandstone is increased, and the pores formed by mutual stacking are smaller, resulting in the decreasing permeability of the artificial core.

According to the present disclosure, it is preferable that the sand particles is gravel with $\Phi \leq -1$ and/or sand with $\Phi > -1$; further preferably, the gravel with $\Phi \leq -1$ is medium gravel with $-6 < \Phi \leq -2$ and/or fine gravel with $-2 < \Phi \leq -1$; the sand with $\Phi > -1$ is at least one selected from the group consisting of coarse sand with $-1 < \Phi \leq 1$, medium sand with $1 < \Phi \leq 2$, fine sand with $2 < \Phi \leq 3.32$ and silt sand with $3.32 < \Phi \leq 6.64$.

Figure 3:
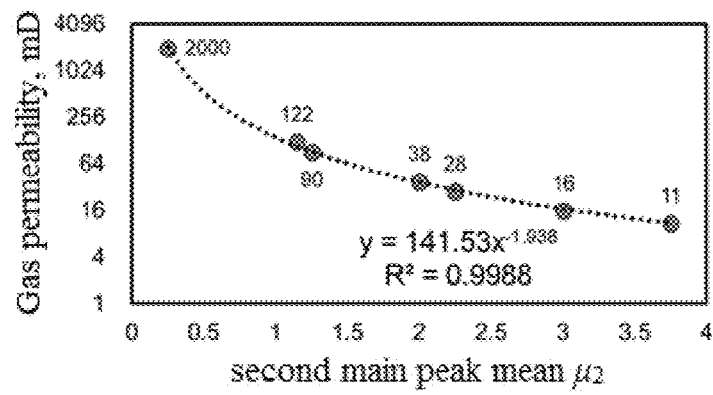
FIG. 3 shows a gas permeability standard curve for an artificial conglomerate and/or sandy conglomerate core provided by the present disclosure.

According to the present disclosure, preferably, the permeability standard curve in the step 3) depends on the lithology; further preferably, when the lithology is conglomerate and/or sandy conglomerate, the permeability standard curve satisfies Formula (II): $K=a\mu_2^b$, wherein K is gas permeability, and a and b are fitting coefficients. As shown in FIG. 3, the gas permeability of artificial conglomerate core and/or artificial sandy conglomerate core decreases in a power exponential fashion as the deposition granularity increases.

Figure 4:
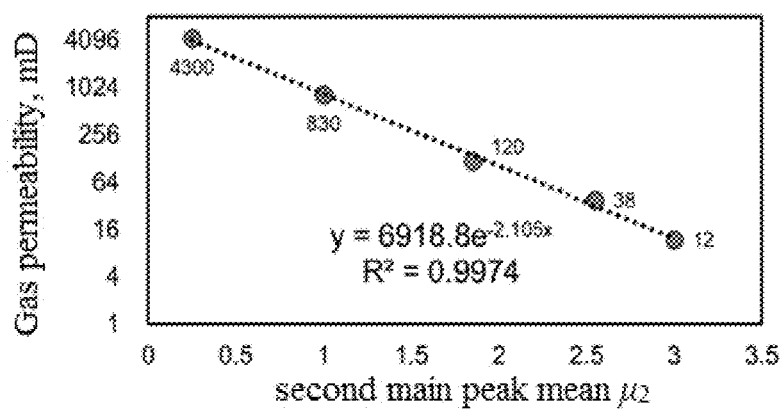
FIG. 4 illustrates a gas permeability standard curve for an artificial conglomerate-bearing core provided by the present disclosure.
Figure 5:
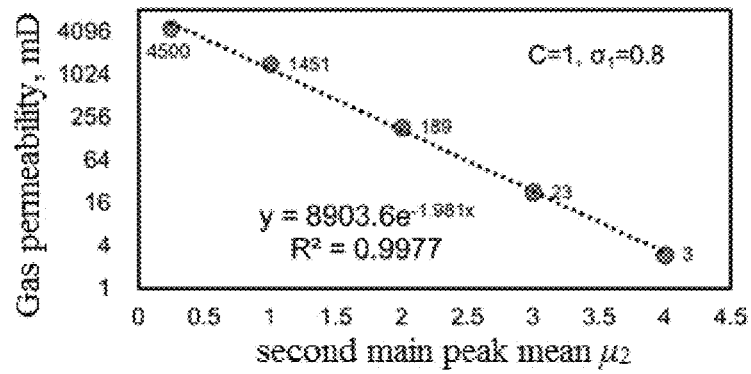
FIG. 5 shows a gas permeability standard curve for an artificial sandstone core provided by the present disclosure.

Further preferably, when the lithology is conglomerate-bearing sandstone and/or sandstone, the permeability standard curve satisfies Formula (III): $K=ae^{b\mu_2}$, wherein K is gas permeability, and a and b are both fitting coefficients. As shown in FIG. 4 and FIG. 5, the gas permeability of the artificial conglomerate-bearing sandstone core and the artificial sandstone core decreases exponentially along with the increased deposition granularity.

In the present application, the relative weight, the first main peak variance and the second main peak variance of the artificial sandstone and/or conglomerate core are determined according to the physical property parameters of natural lithology; the first main peak mean of the artificial sandstone and/or conglomerate core is obtained according to the lithology of the artificial sandstone and/or conglomerate core in combination with a lithology classification chart; the second main peak mean of the artificial sandstone and/or conglomerate core are determined is determined according to the permeability of the artificial sandstone and/or conglomerate core in combination with a permeability standard curve of the lithology. Therefore, a deposition granularity curve of the artificial sandstone and/or conglomerate core is obtained according to the relative weight, the first main peak variance, the first main peak mean, the second main peak variance and the second main peak mean; the granularity and the weight content of the sand particles are subsequently obtained according to the deposition granularity curve.

According to the present disclosure, it is preferable that in the deposition granularity curve of the artificial sandstone and/or conglomerate core in the step 5), the abscissa–deposition granularity satisfies Formula (IV): $\Phi=-\log_2 D$ which determines the particle size of the sand particles; the ordinate–probability percentage is the weight content of the sand particles.

In a preferred embodiment, in the deposition granularity curve of the artificial sandstone and/or conglomerate core, the particle size range and the weight content ratio of the sand particles are determined according to the Formula (IV), and the suitable ore material is further determined based on the particle size range, wherein the ore material is at least one selected from the group consisting of river sand, quartz sand and potash feldspar.

In the present disclosure, the cementing agent is filled in the pores and fractures in the form of small particles, which are similar to the "Argillaceous/matrix cementation" of the natural conglomerate core, such that the pore structure is closer to the actual conglomerate core. Preferably, the weight ratio of the sand particles, the cementing agent and the curing agent is 100:13-20:3-8.

Preferably, the cementing agent comprises: 60-70 parts by weight of Portland cement, 25-35 parts by weight of inorganic salt aqueous solution and 0-5 parts by weight of reinforcing agent.

In the present disclosure, the Portland cement may be selected from a wide range, the Portland cement is cement conventionally used in the technical field. Preferably, the Portland cement is at least one selected from the group consisting of 600 mesh composite Portland cement, 800 mesh ultra-fine cement, 400 mesh Portland cement and 600 mesh Portland cement.

Preferably, concentration of inorganic salt in the inorganic salt aqueous solution is 0.1-1 wt %, preferably 0.3-0.6 wt %; wherein the inorganic salt is at least one selected from the group consisting of calcium chloride, magnesium chloride, sodium bicarbonate, sodium chloride and sodium carbonate.

Preferably, the reinforcing agent is clay and/or aluminum fluoride, wherein the clay is at least one selected from the group consisting of kaolin, montmorillonite, illite and chlorite. When the reinforcing agent is clay, on one hand, the influence of the clay in the stratum on the oil displacement efficiency and the seepage characteristic of the displacing agent can be fully simulated, and on the other hand, the cementing strength can be further improved by utilizing the clay content.

When the reinforcing agent is aluminum fluoride, aluminum atoms can be fully utilized for combining with hydroxyl in tricalcium silicate ($3CaO \cdot SiO_2$) formed by cement solidification to compete and form Si—O—Al bonds, the number of the hydroxyl in a space grid structure formed by saturated solidification can partially inhibit expansion of set cement after long-term contact with water, and enhance stability of the artificial physical model on the flow capacity.

In the present disclosure, the curing agent may be selected from a wide range, preferably, the curing agent is an aqueous solution of inorganic salt, wherein the concentration of inorganic salt in the aqueous solution of the inorganic salt is 0.1-1 wt %, preferably 0.3-0.6 wt %; the inorganic salt is at least one selected from the group consisting of calcium chloride, magnesium chloride, sodium bicarbonate, sodium chloride and sodium carbonate.

In the present disclosure, molding conditions may be selected from a wide range, as long as the cementing agent is molded with the sand particles. Preferably, the molding is performed at a temperature of 10-40° C. and a pressure of 2-16 MPa for 10-30 min.

Preferably, the curing is performed at a temperature of 10-40° C. for 3-5 days.

Figure 6:
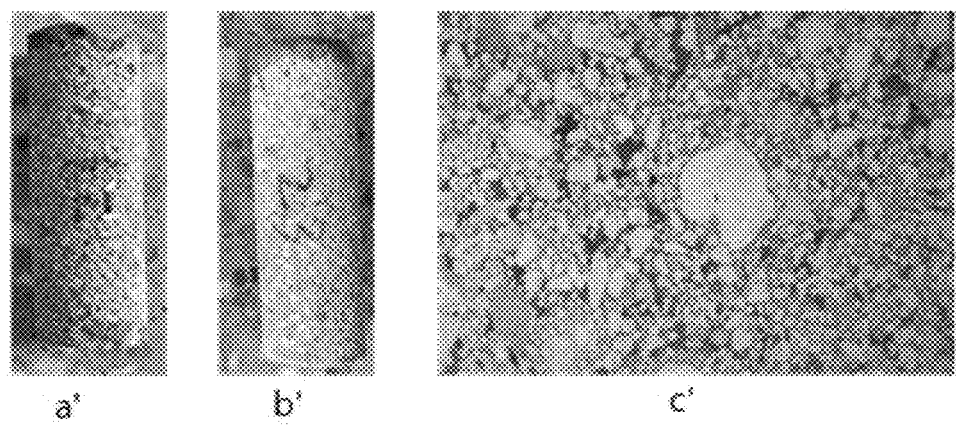
FIG. 6 illustrates a schematic view of exterior appearance of the artificial sandstone and/or conglomerate core provided by the present disclosure, wherein a' illustrates a physical image of a sandy conglomerate core, b' shows a physical image of a conglomerate-bearing sandstone core, and c' illustrates a slice image of a sandstone and/or conglomerate cast body.

In a preferred embodiment of the present disclosure, the sand particles are mixed with the cementing agent in a weight ratio of 100:13-20, subjected to molding and curing in sequence, and the cured product is cut to obtain the artificial core with corresponding size, such as the column-shape core with a diameter Φ of 38 mm or the cuboid core with the dimensions of 45×45×300 mm, wherein the exterior appearance schematic view of the artificial core is shown in FIG. 6, wherein a' illustrates a physical image of a sandy conglomerate core, b' shows a physical image of a conglomerate-bearing sandstone core, and c' illustrates a slice image of a sandy conglomerate cast body.

In a second aspect, the present disclosure provides an artificial sandstone and/or conglomerate core produced with the method provided in the first aspect.

According to the present disclosure, lithology of the artificial sandstone and/or conglomerate core is preferably at least one selected from the group consisting of conglomerate, sandy conglomerate, conglomerate-bearing sandstone and sandstone.

Preferably, gas permeability of the artificial sandstone and/or conglomerate core is within a range of 1-5000 mD; wherein the gas permeability is measured by the gas permeability in an industry standard SY/T5336-2006 rock analysis method.

Preferably, the artificial sandstone and/or conglomerate core has a porosity within a range of 14-33%; wherein the porosity is measured by a liquid saturation method in the industrial standard SY/T5336-2006 rock analysis method.

In a third aspect, the present disclosure provides an application of the artificial sandstone and/or conglomerate core provided in the second aspect in physical simulation of a sandstone and/or conglomerate reservoir formation.

The present disclosure will be described in detail below with reference to examples.

The gas permeability of the artificial sandstone and/or conglomerate core is measured by the gas permeability in the industry standard SY/T5336-2006 rock analysis method;

The porosity of the artificial sandstone and/or conglomerate core is measured by a liquid saturation method in the industrial standard SY/T5336-2006 rock analysis method.

Example 1

Preparation of Gravel-Containing Coarse Sandstone with Gas Permeability of 100-150 mD (1) Composition and Particle Granularity Characteristic Statistics of Natural Core The natural core was derived from the Karamay oil field of China, the deposition granularity curve of the natural core was tested by using an industry standard SY/T5434-2018, as shown in FIG. 1(a), a first main peak variance $\sigma_1$ and a second main peak variance $\sigma_2$ as representatives of a research area were confirmed through inversion fitting of the Formula (I), the statistics showed that the first main peak variance $\sigma_1$ was between 0.6 and 1.1, the second main peak variance $\sigma_2$ was between 1.8 and 2.4, and the relative weight C was between 0.4 and 0.7.

(2) Lithology Control of the Artificial Gravel-Containing Coarse Sandstone Cores According to the lithology classification chart, the artificial core with the lithology of the gravel-containing coarse sandstone was prepared, it was ensured that the first main peak mean $\mu_1$ was within a range of −0.25 to 0.5, that is, the first main peak mean $\mu_1$ was selected to be 0.

(3) Gas Permeability Control for the Gravel-Containing Coarse Sandstone

If it was selected that the content of the cementing agent was 16 wt %, the first main peak mean $\mu_1$ was 0, and the first main peak variance $\sigma_1$ was 0.85; when the second main peak variance $\sigma_2$ was 2.2 and the relative weight C was 0.4, the relationship curve between the permeability of the conglomerate-bearing sandstone and the second main peak mean was as shown in FIG. 4, the fitting coefficients in the Formula (III) were that σ=6918.8 and b=−2.105, in the meanwhile, the equation $K=6918.8\ e^{-2.105\mu_2}$ was satisfied, and 100≤K≤150.

It was derived that 1.827≤$\mu_2$≤2.012, i.e. the second main peak mean $\mu_2$ was chosen to be 1.9.

(4) Preparation of Artificial Gravel-Containing Coarse Sandstone Core with the Gas Permeability of 100-150 mD The manufacturing parameters of the artificial core were determined as follows: C=0.4, $\mu_1$=0, $\mu_2$=1.9, $\sigma_1$=0.85, $\sigma_2$=2.2, such that the deposition granularity curve of the artificial gravel-containing coarse sandstone core was obtained as shown in FIG. 1(b), wherein the content of cementing agent was 16 wt %.

According to FIG. 1(b), in combination with the Formula (IV), the compound ratio of the sand particles was obtained, i.e.: 544 g of river sand with 3-10 meshes, 288 g of river sand with 10-20 meshes, 250 g of river sand with 20-40 meshes, 121 g of river sand with 40-60 meshes, 147 g of river sand with 60-100 meshes, 169 g of quartz sand with 100-200 meshes and 184 g of potassium feldspar with 200-800 meshes were weighted, and uniformly mixed to obtain the sand particles with a total content of 1703 g.

272 g of 600-mesh superfine cement and 130 g of aqueous solution with the calcium chloride mass concentration of 0.4 wt % were mixed with the above-mentioned sand particles uniformly, the mixture was then put into a mould, the mixture was pressed for 10 minutes and preliminarily molded under the compaction stress of 5.11 MPa and the temperature of 25° C., 130 g of aqueous solution with the calcium chloride mass concentration of 0.4 wt % was added, the mixture was continuously solidified for 3 days, and the homogeneous artificial gravel-containing coarse sandstone core with the dimensions Φ3.8×15 cm was prepared after drilling.

The homogeneous artificial gravel-containing coarse sandstone core was tested to have a gas permeability of 122 mD and a porosity of 22.46%.

Example 2

Preparation of Fine Conglomerate with Gas Permeability of 100-150 mD (1) Particle Granularity Characteristic Statistics of Natural Core The fine conglomerate core sample was derived from the Karamay oil field of China, the deposition granularity curve of the natural core was tested by using an industry standard SY/T5434-2018, a first main peak variance $\sigma_1$ and a second main peak variance $\sigma_2$ as representatives of a research area were confirmed through inversion fitting of the Formula (I), the statistics showed that the first main peak variance $\sigma_1$ was between 0.5 and 1.2, the second main peak variance $\sigma_2$ was between 1.7 and 2.4, and the relative weight C was between 0.3 and 0.6.

(2) Lithology Control of the Artificial Fine Conglomerate

According to the lithology classification chart, the artificial core with the lithology of the fine conglomerate was prepared, it was ensured that the first main peak mean $\mu_1$ was within a range of −1 to −0.5, that is, the first main peak mean $\mu_1$ was selected to be −0.75.

(3) Gas Permeability Control for the Artificial Fine Conglomerate

If it was selected that the content of the cementing agent was 17 wt %, the first main peak mean $\mu_1$ was −0.75, and the first main peak variance $\sigma_1$ was 0.85; when the second main peak variance $\sigma_2$ was 2.2 and the relative weight C was 0.4, the relationship curve between the permeability of the fine conglomerate and the second main peak mean was as shown in FIG. 3, the fitting coefficients in the Formula (II) were that a=141.53 and b=−1.938, in the meanwhile, the equation $K=141.53\mu_2^{-1.938}$ was satisfied, and $100 \leq K \leq 150$. It was derived that $0.97 \leq \mu_2 \leq 1.2$, i.e. the second main peak mean $\mu_2$ was chosen to be 1.1.

(4) Preparation of Artificial Fine Conglomerate Core with the Gas Permeability of 100-150 mD The manufacturing parameters of the artificial core were determined as follows: C=0.4, $\mu_1$=0.75, $\mu_2$=1.1, $\sigma_1$=0.85, $\sigma_2$=2.2, such that the deposition granularity curve of the artificial fine conglomerate core was obtained, wherein the content of cementing agent was 17 wt %.

According to the deposition granularity curve of the artificial fine conglomerate core, in combination with Formula (IV), the compound ratio of the sand particles was obtained, i.e.: 648 g of river sand with 3-10 meshes, 320 g of river sand with 10-20 meshes, 273 g of river sand with 20-40 meshes, 118 g of river sand with 40-60 meshes, 126 g of river sand with 60-100 meshes, 122 g of quartz sand with 100-200 meshes and 96 g of potassium feldspar with 200-800 meshes were weighted, and uniformly mixed to obtain the artificial core particles with a total content of 1703 g.

289 g of 600 mesh superfine cement and 130 g of aqueous solution with the calcium chloride mass concentration of 0.4 wt % were mixed with the above-mentioned artificial core particles uniformly, the mixture was then put into a mould, the mixture was pressed for 15 minutes and preliminarily molded under the compaction stress of 5.11 MPa and the temperature of 25° C., 130 g of aqueous solution with the calcium chloride mass concentration of 0.4 wt % was added, the mixture was continuously solidified for 3.5 days, and the homogeneous artificial fine conglomerate core with the dimensions Φ3.8×15 cm was prepared after drilling.

The homogeneous artificial fine conglomerate core was tested to have a gas permeability of 118 mD and a porosity of 18.21%.

Example 3

Preparation of Medium Sandstone with Gas Permeability of 500-550 mD (1) Particle Granularity Characteristic Statistics for Natural Core The medium sandstone sample is derived from Daqing oil field in China, the deposition granularity curve of the natural core was tested by using an industry standard SY/T5434-2018, a first main peak variance $\sigma_1$ and a second main peak variance $\sigma_2$ as representatives of a research area were confirmed through inversion fitting of the Formula (I), the statistics showed that the first main peak variance $\sigma_1$ was between 0.45 and 1.2, the second main peak variance $\sigma_2$ was between 1.7 and 3.5, and the relative weight C was between 0.55 and 0.75.

(2) Lithology Control of the Artificial Medium Sandstone

According to the lithology classification chart, the artificial core with the lithology of the medium sandstone was prepared, it was ensured that the first main peak mean $\mu_1$ was within a range of 1-2, that is, the first main peak mean $\mu_1$ was selected to be 1.35.

(3) Gas Permeability Control for the Artificial Medium Sandstone

If it was selected that the content of the cementing agent was 16 wt %, the relationship curve between the permeability of the sandstone and the second main peak mean was as shown in FIG. 5, the fitting coefficients in the Formula (III) were that a=8903.6 and b=−1.981, in the meanwhile, the equation $K=8903.6\,e^{-1.981\mu_2}$ was satisfied, and $500 \leq K \leq 550$.

It was derived that $1.4 \leq \mu_2 \leq 1.45$, i.e. the second main peak mean $\mu_2$ was chosen to be 1.425.

(4) Preparation of Artificial Medium Sandstone Core with the Gas Permeability of 500-550 mD The manufacturing parameters of the artificial core were determined as follows: C=0.4, $\mu_1$=1.35, $\mu_2$=1.425, $\sigma_1$=0.85, $\sigma_2$=2.2, such that the deposition granularity curve of the artificial medium sandstone core was obtained, wherein the content of cementing agent was 16 wt %.

According to the deposition granularity curve of the artificial medium sandstone core, in combination with the Formula (IV), the compound ratio of the sand particles was obtained, i.e.: 198 g of river sand with 10-20 meshes, 526 g of river sand with 20-40 meshes, 346 g of river sand with 40-60 meshes, 299 g of river sand with 60-100 meshes, 196 g of quartz sand with 100-200 meshes and 139 g of potassium feldspar with 200-800 meshes were weighted, and uniformly mixed to obtain the artificial medium sandstone core particles with a total content of 1703 g.

272 g of 600 mesh superfine cement and 123 g of aqueous solution with the calcium chloride mass concentration of 0.4 wt % were mixed with the above mentioned artificial core particles uniformly, the mixture was then put into a mould, the mixture was pressed for 30 minutes and preliminarily molded under the compaction stress of 5.11 MPa and the temperature of 25° C., 130 g of aqueous solution with the calcium chloride mass concentration of 0.4 wt % was added, the mixture was continuously solidified for 5 days, and the homogeneous artificial medium sandstone core with the dimensions Φ3.8×15 cm was prepared after drilling.

The homogeneous artificial medium sandstone core was tested to have a gas permeability of 535 mD and a porosity of 25.5%.

According to the Examples 1-3, the properties of the artificial sandstone and/or conglomerate core and the composition of the sand particles are combined in the present disclosure, and particularly, the composition of the sand particles is regulated and controlled according to the lithology and permeability of the artificial sandstone and/or conglomerate core, so as to perform the precise control of the artificial sandstone and/or conglomerate core.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A method for preparing an artificial sandstone and/or conglomerate core, comprising the following steps: mixing and molding sand particles and a cementing agent in sequence, and further adding a curing agent for performing solidification to prepare the artificial sandstone and/or conglomerate core;
wherein composition of the sand particles is determined according to properties of the artificial sandstone and/or conglomerate core comprising lithology and permeability,
wherein the lithology of the artificial sandstone and/or conglomerate core is at least one selected from the group consisting of conglomerate, sandy conglomerate, conglomerate-bearing sandstone and sandstone; and the permeability is gas permeability of the artificial sandstone and/or conglomerate core within a range of 1-5000 mD;
wherein the composition of the sand particles is regulated and controlled by Formula (I), $$f(\Phi) = \frac{C}{\sqrt{2\pi}\,\sigma_1} \cdot \exp\left(-\frac{(\Phi-\mu_1)^2}{2\sigma_1^2}\right) + \frac{1-C}{\sqrt{2\pi}\,\sigma_2} \cdot \exp\left(-\frac{(\Phi-\mu_2)^2}{2\sigma_2^2}\right) \quad (I)$$

wherein f is deposition granularity curve; $\Phi$ is deposition granularity; C is relative weight, $0 \leq C \leq 1$; $\mu_1$ is a first main peak mean, $\sigma_1$ is a first main peak variance; $\mu_2$ is a second main peak mean, and $\sigma_2$ is a second main peak variance;
wherein the composition of the sand particles is regulated and controlled by the following steps:
1) taking physical property parameters of a natural core as target parameters for regulating and controlling the artificial sandstone and/or conglomerate core, wherein the physical property parameters comprise the relative weight, the first main peak variance and the second main peak variance;
2) obtaining a lithology classification chart based on the relative weight, the first main peak variance and the second main peak variance, and then obtaining the first main peak mean of the artificial sandstone and/or conglomerate core according to the lithology classification chart;
3) obtaining the second main peak mean of the artificial sandstone and/or conglomerate core according to permeability standard curve of the lithology;
4) obtaining a deposition granularity curve of the artificial sandstone and/or conglomerate core according to the relative weight, the first main peak mean, the first main peak variance, the second main peak mean and the second main peak variance; and
5) determining particle size and weight content of the sand particles according to the deposition granularity curve of the artificial sandstone and/or conglomerate core;
wherein the permeability standard curve in the step 3) depends on the lithology;
when the lithology is conglomerate and/or sandy conglomerate, the permeability standard curve satisfies Formula (II): $K = a\mu_2^b$, wherein K is gas permeability, $\mu_2$ is a second main peak mean, and a and b are fitting coefficients; and/or
when the lithology is conglomerate-bearing sandstone and/or sandstone, the permeability standard curve satisfies Formula (III): $K = ae^{b\mu_2}$, wherein K is gas permeability, $\mu_2$ is a second main peak mean, e is natural constant, and a and b are fitting coefficients.

2. The method of claim 1, wherein the physical property parameters of the natural core in the step 1) are obtained by inverse fitting according to the Formula (I).

3. The method of claim 1, wherein the lithology classification chart in the step 2) is obtained by the following steps:
A. Respectively drawing corresponding deposition granularity curves by adjusting relative distance of the first main peak and the second main peak based on the relative weight, the first main peak variance and the second main peak variance in the step 1);
B. Respectively counting weight of particles with different deposition granularities based on the deposition granularity curve, and classifying the lithology of the corresponding core;
C. Drawing the lithology classification charts with different deposition granularities by taking the first main peak mean as an abscissa and the second main peak mean as an ordinate.

4. The method of claim 1, wherein in the deposition granularity curve of the artificial sandstone and/or conglomerate core in the step 5), the abscissa–deposition granularity satisfies Formula (IV): $\Phi = -\log_2 D$ which determines the particle size of the sand particles; the ordinate–probability percentage is the weight content of the sand particles, wherein $\Phi$ is deposition granularity and D is particle size of sand particles.

5. The method of claim 4, wherein the sand particles is gravel with $\Phi \leq -1$ and/or sand with $\Phi > -1$.

6. The method of claim 5, wherein the gravel with $\Phi \leq -1$ is medium gravel with $-6 < \Phi \leq -2$ and/or fine gravel with $-2 < \Phi \leq -1$.

7. The method of claim 5, wherein the sand with $\Phi > -1$ is at least one selected from the group consisting of coarse sand with $-1 < \Phi \leq 1$, medium sand with $1 < \Phi \leq 2$, fine sand with $2 < \Phi \leq 3.32$ and silt sand with $3.32 < \Phi \leq 6.64$.

8. The method of claim 1, wherein the weight ratio of the sand particles, the cementing agent and the curing agent is 100:13-20:3-8.

9. The method of claim 8, wherein the cementing agent comprises: 60-70 parts by weight of Portland cement, 25-35 parts by weight of inorganic salt aqueous solution and 0-5 parts by weight of reinforcing agent.

10. The method of claim 1, wherein the molding is performed at a temperature of 10-40° C. and a pressure of 2-16 MPa for 10-30 min.

11. The method of claim 1, wherein the curing is performed at a temperature of 10-40° C. for 3-5 days.

* * * * *